(12) United States Patent
Zhang

(10) Patent No.: US 9,366,321 B2
(45) Date of Patent: Jun. 14, 2016

(54) PLANETARY GEAR TRANSMISSION AND ELECTRIC VEHICLE

(75) Inventor: Mingliang Zhang, Shanghai (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/404,111

(22) PCT Filed: May 31, 2012

(86) PCT No.: PCT/CN2012/076362
§ 371 (c)(1),
(2), (4) Date: Nov. 26, 2014

(87) PCT Pub. No.: WO2013/177785
PCT Pub. Date: Dec. 5, 2013

(65) Prior Publication Data
US 2015/0099601 A1    Apr. 9, 2015

(51) Int. Cl.
| | | |
|---|---|---|
| *F16H 3/44* | (2006.01) |
| *F16H 3/78* | (2006.01) |
| *B62M 11/14* | (2006.01) |
| *B62K 11/04* | (2006.01) |
| *B60K 17/08* | (2006.01) |
| *B60K 17/16* | (2006.01) |

(52) U.S. Cl.
CPC  *F16H 3/78* (2013.01); *B60K 17/08* (2013.01); *B60K 17/16* (2013.01); *B62K 11/04* (2013.01); *B62M 11/14* (2013.01); *F16H 2200/0021* (2013.01); *F16H 2200/2005* (2013.01)

(58) Field of Classification Search
CPC ............... F16H 2200/2064; F16H 2200/2097; F16H 2200/2005
See application file for complete search history.

(56) References Cited

U.S. PATENT DOCUMENTS

| | | | |
|---|---|---|---|
| 5,588,930 A | 12/1996 | Chen | |
| 6,196,944 B1 | 3/2001 | Schmitz | |
| 6,513,401 B2 | 2/2003 | Bologna | |
| 6,663,529 B1 * | 12/2003 | Haka | F16H 3/666 475/303 |
| 8,257,214 B2 * | 9/2012 | Knoblauch | B60K 6/365 180/65.235 |
| 8,845,478 B2 * | 9/2014 | Oguri | F16H 3/66 475/285 |
| 2003/0125150 A1 | 7/2003 | Tanzer | |
| 2007/0042859 A1 * | 2/2007 | Bader | F16H 37/046 475/303 |
| 2007/0049451 A1 | 3/2007 | Mizon et al. | |
| 2008/0081726 A1 | 4/2008 | Saito et al. | |
| 2011/0172044 A1 * | 7/2011 | Venturi | B60K 6/383 475/5 |
| 2011/0312460 A1 | 12/2011 | Nett et al. | |

FOREIGN PATENT DOCUMENTS

| | | |
|---|---|---|
| CN | 2661479 | 12/2004 |
| CN | 2875938 | 3/2007 |
| CN | 101544181 | 9/2009 |

(Continued)

OTHER PUBLICATIONS

International Search Report for Application No. PCT/CN2012/076362 dated Mar. 7, 2013 (2 pages).

*Primary Examiner* — Tisha Lewis
(74) *Attorney, Agent, or Firm* — Michael Best & Friedrich LLP

(57) ABSTRACT

A planetary gear transmission includes a planetary gear train having a sub gear, a fixed annular gear, at least one planet gear and a planet carrier; a synchronizer configured to be driven into a first coupling state in which it couples the sun gear with a prime mover, and a second coupling state in which it couples the planet carrier with the prime mover; and an actuator configured for selectively driving the synchronizer into one of its first and second coupling states.

18 Claims, 1 Drawing Sheet

(56) References Cited

FOREIGN PATENT DOCUMENTS

| | | |
|---|---|---|
| CN | 102182801 | 9/2011 |
| DE | 9100932 | 4/1991 |
| EP | 0132023 | 1/1985 |
| GB | 2465997 | 6/2010 |
| JP | 11217025 | 8/1999 |
| WO | 02/30697 | 4/2002 |

* cited by examiner

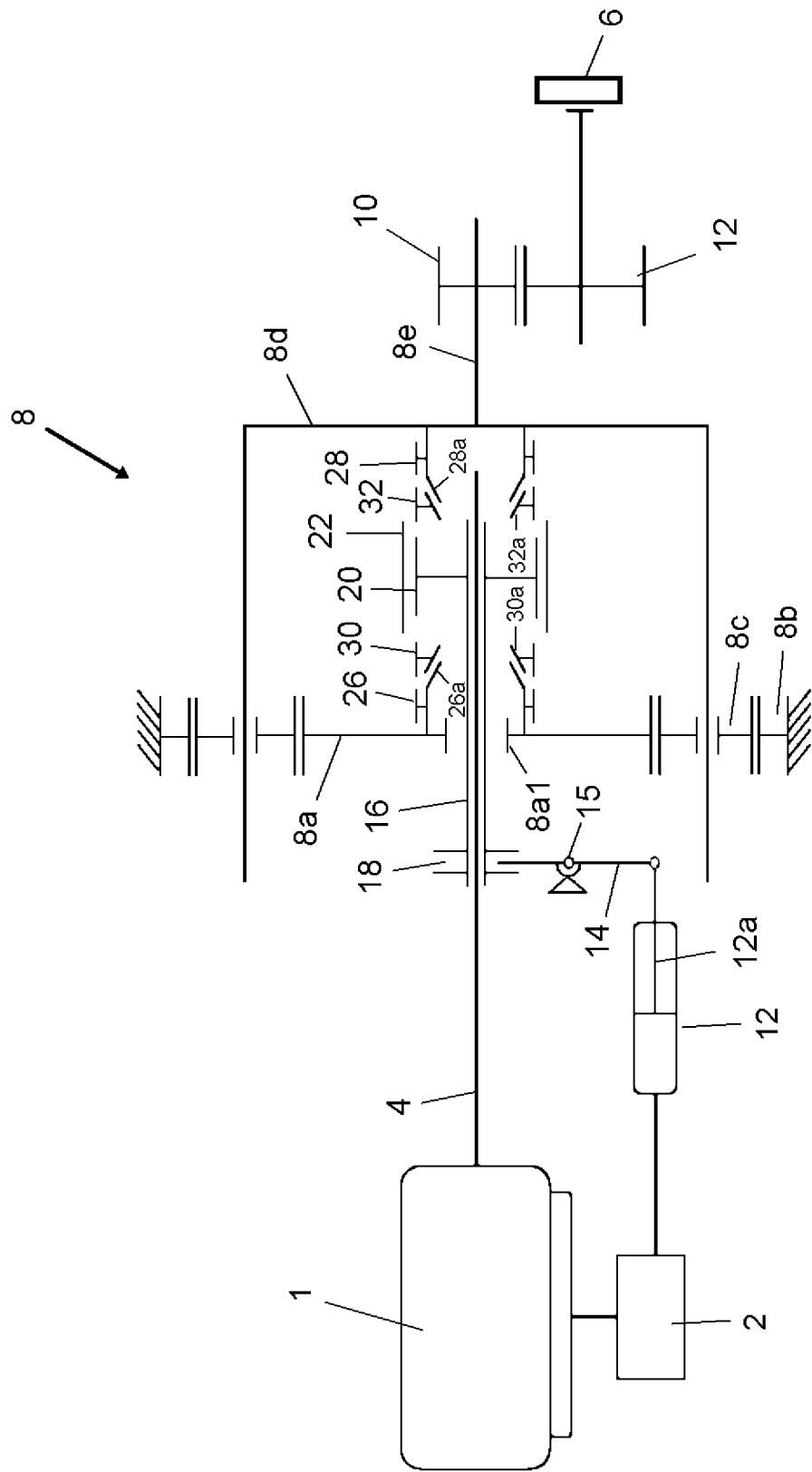

PLANETARY GEAR TRANSMISSION AND ELECTRIC VEHICLE

BACKGROUND OF THE INVENTION

The present invention relates to an improved planetary gear transmission, in particular for an electric vehicle, which provides two speed ratios with a simple configuration. The present invention also relates to an electric vehicle comprising such a planetary gear transmission.

Electric vehicles generally use at least one electric motor for propulsion. Output rotation and torque of the electric motor are transmitted to the wheels of the vehicle via a transmission.

For example, U.S. Pat. No. 6,513,401B2 discloses a transmission unit for axles of vehicles with electric drive, the transmission unit comprising a drive gear, a driven gear, and an intermediate idler gear meshing with both the drive gear and the driven gear. The speed ratio of the transmission unit can be varied by replacing the drive gear and the driven gear and displacing the axis of rotation of the idler gear. However, once the drive gear and the driven gear are set, the transmission unit provides only a fixed speed ratio.

It is known that an electric motor has a desired speed range in which the electric motor operates in a high efficiency region. The operation efficiency of the electric motor decreases when the speed of the electric motor falls out of this desired speed range. For an electric vehicle having a transmission with a single or fixed speed ratio, as that disclosed in U.S. Pat. No. 6,513,401B2, the electric motor has to operate at a low speed with a low efficiency in some conditions, especially when the running speed of the vehicle is low.

In order to increase the operation efficiency of the electric motor by operating it in the high efficiency region, a transmission which provides more than one speed ratio could be adopted. As an example, CN2875938Y discloses a two-speed automatic transmission for electric vehicles, the transmission comprising two gear pairs for providing different speed ratios, an output shaft which is able to be selectively coupled with either of the two gear pairs, and a splined hub fixed to the output shaft and configured to be displaced by means of a lever. When the vehicle runs at a low speed, the transmission is switched automatically to provide a higher speed ratio so that the electric motor operates at a higher speed, which results in higher efficiency of the electric motor.

However, a transmission with more than one speed ratio generally has a complex configuration. For example, two gear pairs are used in the automatic transmission disclosed in CN2875938Y. Such a transmission may be expensive or have a large size.

It is thus highly desirable to have a transmission which can provide more than one speed ratio with a simple configuration.

SUMMARY OF THE INVENTION

In view of the problems existed in the prior art, an object of the invention is to provide an improved transmission for an electric vehicle which can provide more than one speed ratio in a simple and easy way.

For achieving this object, the present invention in one aspect provides a planetary gear transmission, in particular for an electric vehicle, comprising a planetary gear train which comprises a sun gear rotatable around a central axis, a fixed annular gear disposed coaxially around the sun gear, at least one planet gear meshing between the sun gear and the annular gear, and a planet carrier which carries the at least one planet gear and is rotatable round the central axis of the sun gear; a synchronizer configured for coupling the planetary gear train with an rotary output shaft of a prime mover, the synchronizer being configured to be driven into a first coupling state in which it couples the sun gear with the output shaft of the prime mover, and a second coupling state in which it couples the planet carrier with the output shaft of the prime mover; and an actuator configured for selectively driving the synchronizer into one of its first and second coupling states.

In accordance with a preferred embodiment of the invention, the output shaft of the prime mover is coaxial with an output gear connected to the planet carrier.

In accordance with a preferred embodiment of the invention, the transmission provides a first speed ratio when the synchronizer is in the first coupling state and a second speed ratio when the synchronizer is in the second coupling state, the second speed ratio being equal to 1, and the first speed ratio being larger than 1.

In accordance with a preferred embodiment of the invention, the synchronizer comprises: a splined hub carried by the output shaft of the prime mover, the splined hub being able to be displaced along the output shaft in opposite axial directions and being able to be rotated together with the output shaft; an engagement sleeve carried by the splined hub; a first engagement ring fixed to the sun gear and being able to be engaged by the engagement sleeve; and a second engagement ring fixed to the planet carrier and being able to be engaged by the engagement sleeve.

In accordance with a preferred embodiment of the invention, the splined hub is carried by the output shaft via a sleeve which is coupled by coaxial spline coupling with the output shaft.

In accordance with a preferred embodiment of the invention, the output shaft, the splined hub and the first and second engagement rings are coaxial with the sun gear.

In accordance with a preferred embodiment of the invention, the first and second engagement rings are disposed at axially opposite sides of the splined hub.

In accordance with a preferred embodiment of the invention, the splined hub comprises external teeth, the engagement sleeve comprises internal teeth that are engaged with the external teeth of the splined hub, and the first and second engagement rings each comprise external splined teeth that can be engaged by the internal teeth of the engagement sleeve.

In accordance with a preferred embodiment of the invention, the first and second engagement rings are each provided with a frictional taper; and the synchronizer further comprises first and second friction rings attached to axially opposite ends of the splined hub, the first and second friction rings being each provided with a frictional taper facing towards the frictional taper of a corresponding one of the first and second engagement rings.

In accordance with a preferred embodiment of the invention, the transmission further comprises a lever connected between the actuator and the engagement sleeve so that the actuator drives the engagement sleeve to move axially via the lever.

In accordance with a preferred embodiment of the invention, the actuator comprises an electric, electromagnetic, pneumatic or hydraulic type linear or rotary actuator.

In accordance with a preferred embodiment of the invention, the synchronizer is disposed substantially within the profile defined by the planetary gear train.

The present invention in another aspect provides an electric vehicle comprising an electric motor as a prime mover; a planetary gear transmission described above, the planet carrier of the planetary gear train of the transmission being coupled with at least one wheel of the vehicle; and a controller connected with the electric motor and the actuator of the transmission for controlling the operations of the electric motor and the actuator.

In accordance with a preferred embodiment of the invention, the at least one wheel comprises a pair of wheels, and the transmission is coupled with the pair of wheels via a differential.

In accordance with a preferred embodiment of the invention, the electric motor and the transmission are integrated into a single housing.

The invention provides a high-efficiency vehicle transmission that achieves two speed ratios so as to allow optimal extraction of motor performance in both low and high vehicle speed regions.

Further, the transmission of the invention has a simple and compact structure, which is advantageous for lowering down the cost of the transmission.

Furthermore, by means of the transmission of the invention, the change in vehicle speed at the time of gear shifting is reduced, and thus good driving feeling can be obtained.

BRIEF DESCRIPTION OF THE DRAWINGS

The invention will be further understood by reading the following detailed description with reference to the drawings in which:

FIG. 1 is a schematic diagram of a power train of an electric vehicle according to a preferred embodiment of the invention.

DETAILED DESCRIPTION

First, it is noted that the transmission of the invention is proposed in view of a fact that an electric motor itself has a wide speed range. In some conditions, two-speed transmissions may be good enough for electric vehicles, especially low price vehicles, if most of concerned objectives can be achieved. Thus, the invention is aimed at a two-speed transmission for an electric vehicle.

A main function of the transmission according to the invention is to enable the electric motor to be able to operate in its high efficiency region. A two-speed transmission having this as well as other functions will be described now with reference to the drawings.

FIG. 1 shows schematically a power train of an electric vehicle according to a preferred embodiment of the invention. The illustrated power train comprises an electric motor 1 which acts as an electro-mechanical energy converter for converting electricity to mechanical power. During normal driving of the electric vehicle, the electric motor 1 is energized by electricity from an on-board battery pack and outputs rotational movement and torque. Optionally, the electric motor 1 may additionally act as an electric generator during brake operation of the electric vehicle for converting braking force into electricity which may be fed back to the battery pack.

The operation of the electric motor 1 is controlled by a controller 2. The controller 2 may be the vehicle ECU (electronic control unit), a sub-module in the vehicle ECU, an individual controller communicated with the vehicle ECU or the like. The controller 2 receives commands from the driver, including information about operations to the gearshift, the acceleration pedal and other pedals as well as other related information, and then controls the electric motor 1 to rotate in a desired direction at a desired speed. The speed of the electric motor 1 depends on various factors, such as the intensity of the electric current supplied from the battery pack, driving resistance of the vehicle, etc.

The electric motor 1 has an output shaft 4 for outputting rotational movement and torque which are transmitted to at least one wheel 6 of the vehicle via a two-speed planetary gear transmission 8.

The at least one wheel may comprises a pair of wheels, and in this case, the transmission 8 is coupled with the pair of wheels via a differential. The pair of wheels form a pair of driving wheels of the electric vehicle. The electric vehicle may have a pair of front driving wheels, a pair of back driving wheels, or two pairs of front and back driving wheels. The differential, which may be an integrated bevel gear differential, allows the two wheels to rotate at different speeds. In this way, a pair of driving wheels may be driven by a common electric motor 1 via a common transmission 8.

The transmission 8 comprises a planetary gear train. The planetary gear train mainly comprises a sun gear 8a which is rotatable round a central axis, a fixed annular gear or gear ring 8b disposed coaxially around the sun gear 8a, at least one planet gear 8c meshing between the sun gear 8a and the annular gear 8b, and a planet carrier 8d which carries the at least one planet gear 8c and is rotatable round the same central axis with the sun gear 8a. The entire planetary gear train is also referred to as sun-planet-annulus train. Note that generally more than one planet gear 8c is provided between the sun gear 8a and the annular gear 8b primarily for sharing load and giving better balance.

An output gear 10 is carried by the planet carrier 8d via a rotary shaft 8e which is connected to the planet carrier 8d and is coaxial with the sun gear 8a, and is coupled with a final drive 12 for the wheel 6. The final drive 12 may comprise a gear meshing with the output gear 10. When a pair of wheels are driven by the final drive 12, the final drive 12 comprises the differential disposed between the transmission 8 and the pair of wheels.

The planet carrier 8d acts as an output member of the planetary gear train. When the sun gear 8a is used as an input member of the planetary gear train, the speed ratio (gear ratio) between the sun gear 8a and the planet carrier 8d can be found using the fundamental equation for epicyclic trains at every point where two gears mesh; thus we can write $$(\omega 8a - \omega 8d)/(\omega 8b - \omega 8d) = -Z8b/Z8a$$

where $\omega 8a$, $\omega 8b$ and $\omega 8d$ are rotational velocities of the sun gear 8a, the annular gear 8b and the planet carrier 8d respectively, and $Z8a$ and $Z8b$ are numbers of teeth of the sun gear 8a and the annular gear 8b.

Since the annular gear 8b is fixed, $\omega 8b=0$.

Thus, the speed ratio between the sun gear 8a and the planet carrier 8d is derived:

$$\omega 8a/\omega 8d = 1 + Z8b/Z8a$$

It can be seen that the speed ratio between the sun gear 8a and the planet carrier 8d is constantly larger than 1.

The output shaft 4 of the electric motor 1 is coaxial with the sun gear 8a and extends through a gear hub 8a1 of the sun gear 8a. It is appreciated that the output shaft 4 may be long enough to extend through the gear hub 8a1. Alternatively, the output shaft 4 may be lengthened or comprise an extension which enables the output shaft 4 to extend through the gear hub 8a1.

According to a basic spirit of the invention, the output shaft 4 is selectively couplable with either of the sun gear 8a and the planet carrier 8d of the planetary gear train so that either of the sun gear 8a and the planet carrier 8d is able to act as the input member of the planetary gear train. For this end, the transmission 8 further comprises a synchronizer.

It is noted that synchronizers are widely used in vehicle fields. For example, a synchromesh manual transmission in a vehicle may comprise a synchronizer to allow smooth engagement of gears. Thus, description to some structural details of the synchronizer is omitted.

The synchronizer used in the transmission 8 of the invention comprises a sleeve 16 which is coupled by coaxial spline coupling with the output shaft 4 of the electric motor 1. In this way, the sleeve 16 is movable along the output shaft 4 in opposite axial directions and rotatable together with the output shaft 4.

The sleeve 16 may be axially moved by any suitable actuator. In the embodiment shown in FIG. 1, an actuator 12 for moving the sleeve is in the form of a linear actuator which is able to output a linear movement. The actuator 12 is connected with and controlled by the controller 2. In addition, the linear actuator is shown as a pneumatic or hydraulic cylinder having a piston rod 12a for moving the sleeve 16 back and forth. A lever 14, which is pivotable about a pivot 15, is disposed between the actuator 12 and the sleeve 16, mainly for actuating the sleeve 16 with an increased force. The lever 14 is connected with the front end of the piston rod 12a at a first end and connected with the sleeve 16 at a second end. The sleeve 16 may be provided at its end which is proximal to the electric motor 1 with a grooved member or portion 18 having a circular groove in which the second end of the lever 14 is received.

It is appreciated that the lever 14 can be omitted if the actuator 12 itself can provide enough force for moving the sleeve 16. It is also appreciated that the actuator 12 may alternatively be an electric, electromagnetic, pneumatic or hydraulic motor, a solenoid or any other actuators that can output a linear or rotary movement.

The synchronizer further comprises a splined hub 20 having external teeth and mounted around the sleeve 16, for example, at the end of the sleeve which is away from the electric motor 1, and an engagement sleeve 22 carried by the splined hub 20. The engagement sleeve 22 has internal teeth that are engaged with the external teeth of the splined hub 20, so that the engagement sleeve 22 is axially slidable along the splined hub 20 in opposite axial directions. The engagement sleeve 22 is retained by spring type centering means (not shown) at an axially centered position with respect to the splined hub 20. When an external axial force higher than the force of the centering means is applied to the engagement sleeve 22, the engagement sleeve 22 is displaced axially with respect to the splined hub 20. After the external force is removed or becomes lower than the force of the centering means, the engagement sleeve 22 returns back to its axially centered position with respect to the splined hub 20 under the help of the centering means.

The synchronizer further comprises first and second engagement rings 26 and 28 fixed to the sun gear 8a and the planet carrier 8d respectively at axially opposite sides of the splined hub 20. The first and second engagement rings 26 and 28 are coaxial with the sun gear 8a and the planet carrier 8d, and are configured to drive the sun gear 8a and the planet carrier 8d to rotate respectively. The outer circumferences of first and second engagement rings 26 and 28 have the same diameter and are both formed with external splined teeth similar to that of the splined hub 20, so that the first and second engagement rings 26 and 28 can be engaged by the engagement sleeve 22.

The first and second engagement rings 26 and 28 are symmetrically disposed and are each provided with a frictional taper 26a or 28a on their opposing ends. First and second friction rings 30 and 32 are attached to axially opposite ends of the splined hub 20. The first and second friction rings 30 and 32 are each provided with a frictional taper 30a or 32a which faces towards the frictional taper 26a or 28a but is separated from it by a small distance. The first and second friction rings 30 and 32 are each axially movable in a direction towards the splined hub 20 under an external axial force. When the external axial force is removed, the frictional taper 30a or 32a is moved in a direction away from the splined hub 20 by returning means (not shown).

It is appreciated that the first and second friction rings 30 and 32 may alternatively be attached to the first and second engagement rings 26 and 28 respectively.

The synchronizer may be disposed substantially within the profile defined by the planetary gear train.

By means of the actuator 12, the sleeve 16 is movable back and forth along the output shaft 4, so that the splined hub 20 as well as the engagement sleeve 22 and first and second friction rings 30 and 32 carried by it move together with the sleeve 16.

When the splined hub 20 moves towards the first engagement ring 26, the frictional taper 30a of the first friction ring 30 comes into contact with the frictional taper 26a. The frictional tapers 30a and 26a are pressed together, so that the output shaft 4 is coupled with the sun gear 8a via the sleeve 16, the splined hub 20 and the frictional tapers 30a and 26a. The difference between the rotational speed of the sun gear 8a and that of the output shaft 4 is reduced gradually. Now the engagement sleeve 22 is not meshed with the first engagement ring 26 yet. After the rotational speed of the sun gear 8a and that of the output shaft 4 become the same, the engagement sleeve 22 comes into fully meshing with the first engagement ring 26.

In this condition, the output shaft 4 of the electric motor 1 is coupled with the sun gear 8a, and the rotation of the output shaft 4 of the electric motor 1 is transmitted to the output gear 10 via the sleeve 16, the splined hub 20, the engagement sleeve 22, the first engagement ring 26, the sun gear 8a, the planet gear 8c and the planet carrier 8d at a first speed ratio of $(1+Z8b/Z8a)$.

On the other hand, when the splined hub 20 moves towards the second engagement ring 28, the frictional taper 32a of the second friction ring 32 comes into contact with the frictional taper 28a. The frictional tapers 32a and 28a are pressed together, so that the output shaft 4 is coupled with the planet carrier 8d via the sleeve 16, the splined hub 20 and the frictional tapers 32a and 28a. The difference between the rotational speed of the planet carrier 8d and that of the output shaft 4 is reduced gradually. Now the engagement sleeve 22 is not meshed with the second engagement ring 28 yet. After the rotational speed of the planet carrier 8d and that of the output shaft 4 become the same, the engagement sleeve 22 comes into fully meshing with the second engagement ring 28.

In this condition, the output shaft 4 of the electric motor 1 is coupled with the planet carrier 8d, and the rotation of the output shaft 4 of the electric motor 1 is transmitted to the output gear 10 via the sleeve 16, the splined hub 20, the engagement sleeve 22, the second engagement ring 28 and the planet carrier 8d at a second speed ratio of 1.

In this way, dual speed ratios are provided by the planetary gear train.

The first speed ratio of the planetary gear train is decided by its structure, in particular by the numbers of teeth of the sun gear 8a and the annular gear 8b. Thus, by deliberately select the numbers of teeth or the diameters of the sun gear 8a and the annular gear 8b, a desired first speed ratio can be obtained.

The movement transmitted through the transmission 8 is reversible. Thus, during normal forward running of the vehicle, the electric motor 1 rotates normally. When the gearshift of the vehicle is put into a reverse location, the electric motor 1 will rotate reversely. As a result, the wheels are driven in a reverse direction.

It is noted that, by means of the frictional tapers, the output shaft 4 of the electric motor 1 can be kinematically coupled smoothly with either the sun gear 8a or the planet carrier 8d which has a speed different from that of the output shaft 4, and the speed difference can be removed quickly.

During a shifting process, the controller 2 controls the electric motor 1 and the actuator 12 coordinately. When the controller receives a shifting command or determines to automatically initiate a speed ratio shifting, the controller controls the torque of the electric motor 1 to output an idle torque. Then the actuator 12 disconnects the synchronizer from its original coupling state. The controller 2 determines a new speed of the electric motor 1 and sends a command to the electric motor 1. Then, the actuator 12 drives the synchronizer into next coupling state. In different stages of the whole shifting process, the output speed of the electric machine 1 should be controlled deliberately. In contrary to internal combustion engines, quick response of electric machines will guarantee a much better performance.

As mentioned above, the electric motor has a desired speed range in which it operates in a high efficiency region. The operation efficiency of the electric motor decreases when the speed of the electric motor falls out of this desired speed range, in particular lower than this desired speed range. According to the invention, when the electric vehicle runs at a low speed, for example, during an accelerating stage after the vehicle is started or the electric vehicle runs on a jam road, the controller 2 controls the actuator 12 to drive the synchronizer into its first coupling state so that the electric motor 1 is kinematically coupled with the sun gear 8a and drives the wheels via the sun-planet-annulus train formed by the planetary gear train at the first speed ratio of $(1+Z8b/Z8a)$. Since the first speed ratio is always larger than 1, the electric motor may operate at a high speed with a high efficiency in the low vehicle speed region.

When the vehicle runs at a high speed, the controller 2 controls the actuator 12 to drive the synchronizer into its second coupling state so that the electric motor 1 is kinematically coupled with the planet carrier 8d and drives the wheels directly via the planet carrier 8d at the second speed ratio of 1. Thus, the electric motor operates also at a high speed with a high efficiency in the high vehicle speed region.

As another advantage of the invention, jerk during gear shifting can be reduced by the synchronizer as well as control strategy of shifting process. Specifically, currently existing solutions of transmissions for electric vehicles are mainly to adapt conventional transmissions of internal combustion engine vehicles to electric vehicles, including manual transmissions, CVTs (Continuous variable transmissions), synchronizer transmissions, etc. However, manual transmissions are relative simple, but are suffered from jerk during gear shifting. CVT and Synchronizer transmissions have no obvious jerk during gear shifting but are expensive and complex. According to the invention, the torque transmitted from the electric motor to the synchronizer can be controlled so that the gear shifting of the transmission will not cause a large jerk during the gear shifting. Thus, with transmission of the invention in which a planetary gear train cooperates with a synchronizer, combining motor torque and speed control during shifting, driving comfort can be improved. At this point, it is noted that, in order to minimize jerk during gear shifting, motor torque during gear shifting must be controlled deliberately.

As yet another advantage of the invention, the cost of the transmission of the invention which has a simple structure can be lowered down. Transmissions in prior art have complicated mechanical structure and control systems, which results in high cost. With the simplified structure of the transmission, formed mainly by the planetary gear train with the synchronizer and the simple actuator, the cost of the transmission can be significantly reduced.

Further, the planetary gear train has lower weight and less inertia, and is smaller than corresponding gear pairs having the same speed ratios. Thus, the transmission of the invention is more compact than conventional transmissions with gear pairs. The electric motor and the transmission of the invention can be integrated into a single housing.

Furthermore, the symmetry properties of planetary gear train provide the transmission of the invention with better characteristics of noise and vibration suppression.

Furthermore, the driving train from the output shaft of the motor to the output shaft of the planetary gear train has a coaxial arrangement, thus it is convenient to use the transmission of the invention in front driving, rear driving, as well as four wheel driving systems.

Simulations show that, by using the transmission with two-speed configuration of the invention, the battery energy consumption can be reduced by 5-10 percent with respect to the industry-standard New European Drive Cycle. Further, suitably selected speed ratios allow the motor to be kept in efficient operating region during more driving cycles.

As mentioned above, the two-speed planetary gear transmission of the invention is particularly advantageous when used in an electric vehicle. However, it is appreciated that the planetary gear transmission is also applicable in other vehicles or equipments which have any type of prime movers that output rotational movements.

While certain embodiments have been described, these embodiments are presented by way of example only, and are not intended to limit the scope of the inventions. The attached claims and their equivalents are intended to cover all the modifications, substitutions and changes as would fall within the scope and spirit of the invention.

What is claimed is:

1. A planetary gear transmission comprising:
   a planetary gear train which comprises a sun gear rotatable around a central axis, a fixed annular gear disposed coaxially around the sun gear, at least one planet gear meshing between the sun gear and the annular gear, and a planet carrier which carries the at least one planet gear and is rotatable round the central axis of the sun gear;
   a synchronizer configured for coupling the planetary gear train with a rotary output shaft of a prime mover, the synchronizer being configured to be driven into a first coupling state in which the synchronizer couples the sun gear with the output shaft of the prime mover, and a second coupling state in which the synchronizer couples the planet carrier with the output shaft of the prime mover; and
   an actuator configured for selectively driving the synchronizer into one of the first and second coupling states,
   wherein the output shaft of the prime mover is coaxial with an output gear connected to the planet carrier.

2. The planetary gear transmission of claim 1, wherein the transmission provides a first speed ratio when the synchronizer is in the first coupling state and a second speed ratio when the synchronizer is in the second coupling state, the second speed ratio being equal to 1, and the first speed ratio being larger than 1.

3. The planetary gear transmission of claim 1, wherein the synchronizer comprises:
a splined hub carried by the output shaft of the prime mover, the splined hub being configured to be displaced along the output shaft in opposite axial directions and being configured to be rotated together with the output shaft;
an engagement sleeve carried by the splined hub;
a first engagement ring fixed to the sun gear and being configured to be engaged by the engagement sleeve; and
a second engagement ring fixed to the planet carrier and being configured to be engaged by the engagement sleeve.

4. The planetary gear transmission of claim 3, wherein the splined hub is carried by the output shaft via a sleeve which is coupled with the output shaft by coaxial spline coupling.

5. The planetary gear transmission of claim 3, wherein the output shaft, the splined hub and the first and second engagement rings are coaxial with the sun gear.

6. The planetary gear transmission of claim 3, wherein the first and second engagement rings are disposed at axially opposite sides of the splined hub.

7. The planetary gear transmission of claim 3, wherein the splined hub comprises external teeth, the engagement sleeve comprises internal teeth that are engaged with the external teeth of the splined hub, and the first and second engagement rings each comprise external splined teeth configured to be engaged by the internal teeth of the engagement sleeve.

8. The planetary gear transmission of claim 3, wherein the first and second engagement rings are each provided with a frictional taper; and
wherein the synchronizer further comprises first and second friction rings attached to axially opposite ends of the splined hub, the first and second friction rings being each provided with a frictional taper facing towards the frictional taper of a corresponding one of the first and second engagement rings.

9. The planetary gear transmission of claim 3, further comprising a lever connected between the actuator and the engagement sleeve so that the actuator drives the engagement sleeve to move axially via the lever.

10. The planetary gear transmission of claim 1, wherein the actuator is a linear or rotary actuator.

11. The planetary gear transmission of claim 1, wherein the synchronizer is disposed substantially within a profile defined by the planetary gear train.

12. An electric vehicle comprising:
an electric motor as a prime mover;
a planetary gear transmission of claim 1, the planet carrier of the planetary gear train of the transmission being coupled with at least one wheel of the vehicle; and
a controller connected with the electric motor and the actuator of the transmission for controlling the operations of the electric motor and the actuator.

13. The electric vehicle of claim 12, wherein the at least one wheel comprises a pair of wheels, and the transmission is coupled with the pair of wheels via a differential.

14. The electric vehicle of claim 12, wherein the electric motor and the transmission are integrated into a single housing.

15. A planetary gear transmission comprising:
a planetary gear train which comprises a sun gear rotatable around a central axis, a fixed annular gear disposed coaxially around the sun gear, at least one planet gear meshing between the sun gear and the annular gear, and a planet carrier which carries the at least one planet gear and is rotatable round the central axis of the sun gear;
a synchronizer configured for coupling the planetary gear train with a rotary output shaft of a prime mover, the synchronizer being configured to be driven into a first coupling state in which the synchronizer couples the sun gear with the output shaft of the prime mover, and a second coupling state in which the synchronizer couples the planet carrier with the output shaft of the prime mover; and
an actuator configured for selectively driving the synchronizer into one of the first and second coupling states,
wherein the synchronizer includes:
a splined hub carried by the output shaft of the prime mover, the splined hub being configured to be displaced along the output shaft in opposite axial directions and being configured to be rotated together with the output shaft,
an engagement sleeve carried by the splined hub,
a first engagement ring fixed to the sun gear and being configured to be engaged by the engagement sleeve, and
a second engagement ring fixed to the planet carrier and being configured to be engaged by the engagement sleeve, and
wherein the first and second engagement rings are disposed at axially opposite sides of the splined hub.

16. The planetary gear transmission of claim 15, wherein the transmission provides a first speed ratio when the synchronizer is in the first coupling state and a second speed ratio when the synchronizer is in the second coupling state, the second speed ratio being equal to 1, and the first speed ratio being larger than 1.

17. A planetary gear transmission comprising:
a planetary gear train which comprises a sun gear rotatable around a central axis, a fixed annular gear disposed coaxially around the sun gear, at least one planet gear meshing between the sun gear and the annular gear, and a planet carrier which carries the at least one planet gear and is rotatable round the central axis of the sun gear;
a synchronizer configured for coupling the planetary gear train with a rotary output shaft of a prime mover, the synchronizer being configured to be driven into a first coupling state in which the synchronizer couples the sun gear with the output shaft of the prime mover, and a second coupling state in which the synchronizer couples the planet carrier with the output shaft of the prime mover; and
an actuator configured for selectively driving the synchronizer into one of the first and second coupling states,
wherein the synchronizer includes:
a splined hub carried by the output shaft of the prime mover, the splined hub being configured to be displaced along the output shaft in opposite axial directions and being configured to be rotated together with the output shaft,
an engagement sleeve carried by the splined hub,
a first engagement ring fixed to the sun gear and being configured to be engaged by the engagement sleeve, and
a second engagement ring fixed to the planet carrier and being configured to be engaged by the engagement sleeve,
wherein the first and second engagement rings are each provided with a frictional taper, and wherein the synchronizer further comprises first and second friction rings attached to axially opposite ends of the splined hub, the first and second friction rings being each provided with a frictional taper facing towards the frictional taper of a corresponding one of the first and second engagement rings.

18. The planetary gear transmission of claim 17, wherein the transmission provides a first speed ratio when the synchronizer is in the first coupling state and a second speed ratio when the synchronizer is in the second coupling state, the second speed ratio being equal to 1, and the first speed ratio being larger than 1.

* * * * *